March 31, 1964 B. J. NORMAN ET AL 3,126,905
PRESSURE RELIEF ASSEMBLY
Filed Nov. 6, 1961

INVENTORS.
Bernard J. Norman
Donovan L. Johnson

Atty.

3,126,905
PRESSURE RELIEF ASSEMBLY
Bernard J. Norman, Fulton, and Donovan L. Johnson, Erie, Ill., assignors to International Harvester Company, Chicago, Ill., a corporation of New Jersey
Filed Nov. 6, 1961, Ser. No. 150,297
3 Claims. (Cl. 137—197)

This invention is directed to a pressure relief assembly, and more particularly to a breather plug unit for use with an enclosed gearbox or in a similar environment.

Breather plugs have been used in connection with gearboxes to afford a vent to the atmosphere and thus provide for ready accommodation of the pressure differentials developed within the gearbox as the gears are driven, thereby avoiding the possibility of damage to the unit which may otherwise occur if the box is completely and effectively enclosed. As the gears are driven the instantaneous pressure adjacent the plug may be positive or negative with respect to atmospheric pressure, and when positive, usually tends to impel oil or other lubricants outwardly through the orifices of the breather plug to the atmosphere. Manifestly it is important to retain the lubricant within the gearcase, thereby to maintain effective and efficient operation of the meshing gears, and it is further desirable to avoid spattering of the lubricant onto personnel and machinery. Accordingly, various attempts have been made to devise some arrangement by which the interior of the gearbox can be vented to the atmosphere without the accompanying disadvantage of discharging the lubricant through the breather plug as the pressure within the gearcase is varied.

One attempt to solve this problem includes the insertion of a wick arrangement extending through the breather plug downwardly into the gearcase. This has proved unwieldy in that some supporting arrangement must be provided for the wick at the lower part of the breather plug. Moreover, the wick action has tended to draw an excessive amount of oil upwardly into the breather plug and to the top of the wick, whence it can be evaporated into the air and thus lose the lubricant even though the air vent or orifice is substantially occluded.

It is therefore a primary object of the present invention to provide a novel breather plug arrangement which effectively prevents the discharge of the lubricant to the atmosphere.

It is an additional object of the invention to provide such a breather plug arrangement which does not necessitate complicated or expensive central support means to position a blocking member centrally within the breather plug.

The foregoing and other objects of the present invention are attained, in one embodiment, by providing a breather plug with a body portion defining a substantially enclosed chamber, which chamber includes a pair of apertures. In accordance with the present invention, a blocking or occluding member is positioned to extend completely through the enclosed chamber, one end of the member extending through each of the apertures in the body portion. The blocking member includes a retaining portion at each of its ends to maintain the blocking member in position, extending through said chamber, and thereby substantially but not completely blocking the apertures of the chamber.

In a preferred embodiment the novel breather plug of the invention is readily fabricated from a breather plug body having an aperture in the top wall thereof, and added thereto is an annular member such as a washer welded to substantially enclose the lower part of the breather plug and thereby define a central chamber. The upper aperture defined in the breather plug and the lower aperture (that is, the washer aperture) together provide indexing means for a centrally positioned occluding member, which can be a cotter pin inserted through the apertures and having the bottom leg portions flared in opposite directions. Accordingly, the top or head portion of the cotter pin and lower flared leg portions in effect comprise two retaining portions of the central occluding member to maintain the cotter pin in the proper position to substantially close the two apertures but still permit the entrance and egress of air and thereby prevent damage to the gearcase as the air pressure therein fluctuates.

The best mode contemplated for carrying out the invention will now be described. To enable those skilled in the art to make and use the invention, such description is set forth in connection with the accompanying drawing, in the several figures of which like reference numerals identify like elements, and in which.

Figure 1:
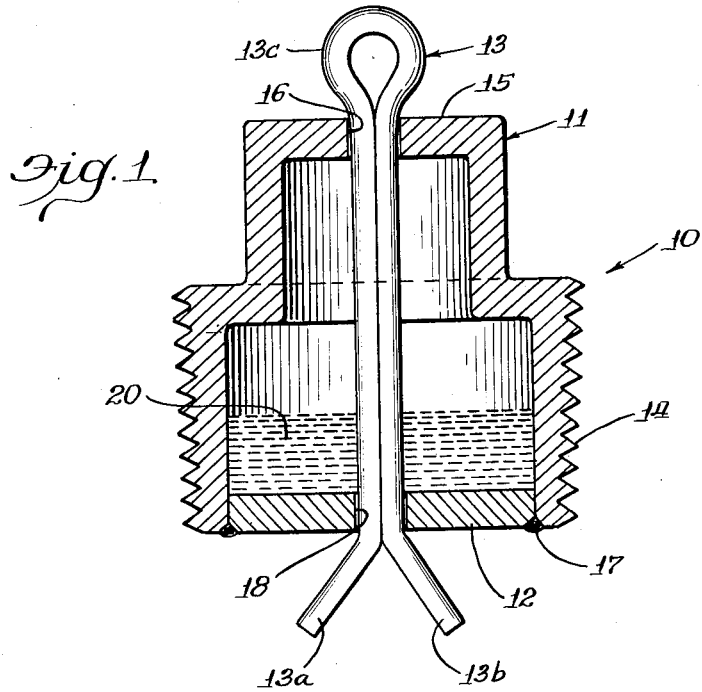
FIG. 1 is a side view, partly in section, of a preferred embodiment of the invention.

As depicted in FIG. 1, pressure relief assembly 10 is comprised of a plug unit 11 joined to an annular member 12 to provide the body portion of the assembly, and an occlusion or blocking member 13 is centrally disposed within the body portion. More specifically, plug unit 11 includes a cylindrical wall section 14 threaded on the exterior thereof for mating engagement with a correspondingly tapped bore in the gearcase cover (not shown), and the upper or top wall portion 15 is apertured at 16 to define a vent or orifice in this wall area. In accordance with a feature of the present invention, the annular member or washer 12 is easily positioned as indicated and secured in place by welding, the resultant weld being referenced by numeral 17, to define with plug unit 11 a central chamber having a first or upper aperture 16 and a second orifice or vent 18 provided at the center of the washer in conventional fashion.

In accordance with another aspect of the invention, the central occluding or blocking member is provided by a cotter pin 13 which includes a pair of leg portions 13a and 13b depending downwardly from a head portion 13c. When a cotter pin is utilized as the blocking member, as shown in the preferred embodiment, it is inserted through the top aperture of the plug unit and through the central aperture of washer 12, and the depending leg portions 13a and 13b are separated to provide, in effect, a retaining portion at the lower end of the occluding member. A corresponding retaining portion is provided by the head 13c at the upper end of the cotter pin. Such an occluding member substantially closes the apertures 16 and 18 and thus prevents the throwing out of oil or other lubricant, without preventing the relief of pressure differentials produced within the gearcase during operation of the gears.

An unexpected and highly beneficial result has been observed with the inventive structure. As the gears are operated and oil is thrown against the lower depending legs 13a and 13b of the blocking member 13, some of the oil flows along the blocking member up into the interior chamber defined by the plug assembly, to provide a small pool or reservoir of oil as indicated by reference numeral 20 in the drawing. It appears that there may be some action, related to capillary action, by which the lubricant traverses the portion of the blocking member at which the two legs 13a and 13b closely abut each other. However, as the oil level builds up an increasing back pressure is provided within the chamber, thus preventing the entry of sufficient fluid to permit some of the lubricant to be blown or forced out the top of the breather plug. Such operation has shown a marked improvement over prior art devices, and particularly over devices such as those which utilize wicks with complicated supporting structures for the wick and which assemblies did not uniformly prevent the venting of the lubricant to the atmosphere.

Figure 2:
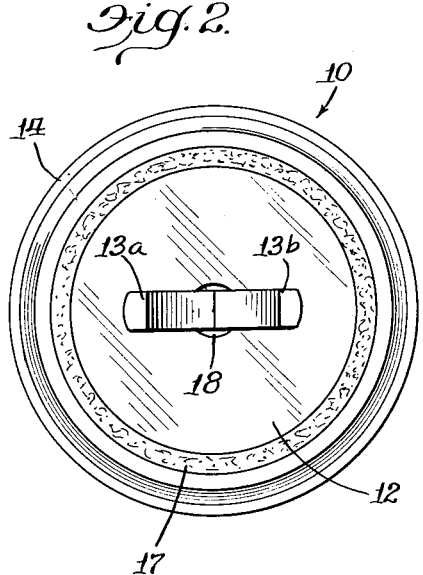
FIG. 2 is a bottom view of the embodiment illustrated in FIG. 1.
Figure 3:
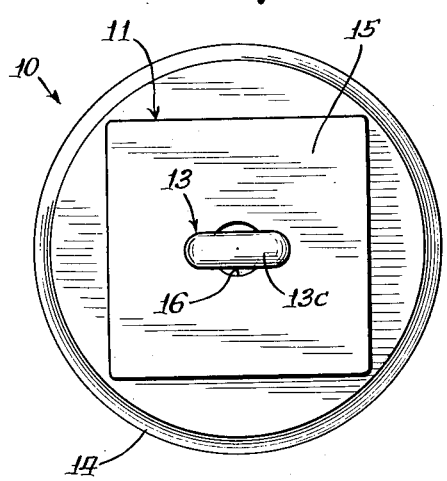
FIG. 3 is a top view of the embodiment illustrated in FIG. 1.

FIG. 2 indicates the lower wall surface of the pressure relief arrangement, with the annular member 12 joined by weld 17 to the lower peripheral portion of the plug unit 11. The head portion of cotter pin 13 is shown in the top view of FIG. 3.

While only a preferred embodiment of the invention has been described and illustrated, it is apparent that modifications and alterations may be made therein, and it is intended in the appended claims to cover all such modifications and alterations as may fall within the true spirit and scope of the invention.

What is claimed is:

1. A pressure relief assembly comprising: a body portion defining a substantially enclosed chamber, said chamber including an upper wall portion defining a first aperture therein and a lower wall portion defining a second aperture therein; and an occluding member extending through said first and second apertures to form a restricted passageway through both apertures and, including a head portion positioned outwardly of said first aperture to restrain said member against displacement in a given direction, and a pair of abutting leg portions in abutting relation within said chamber and flared in opposite directions outwardly of said second aperture to provide a second retaining portion of said member, with the abutting portions of said member within said chamber affording a channel for the entry of lubricant by capillary action.

2. A breather plug assembly comprising: a body portion defining a substantially enclosed chamber and a pair of apertures therein; and a cotter pin having a head portion and a pair of abutting leg portions, said leg portions extending through the chamber to form a restricted passageway through both apertures and with the head portion retaining the cotter pin against axial displacement in a first direction, and said leg portions outwardly of said chamber being flared apart to prevent axial displacement of said cotter pin in a direction opposite said first direction.

3. A breather plug assembly for use in conjunction with a gearcase having a bore tapped to receive the plug assembly comprising: a plug unit including a top portion apertured to define a first orifice therein and a hollow cylindrical side wall portion threaded on the exterior for mating engagement with said tapped bore in a gearcase; an annular member centrally apertured to define a second orifice therein, positioned and affixed at the lower portion of said hollow cylindrical area to define a substantially enclosed chamber with said plug unit; and a cotter pin comprising a head portion and a pair of closely abutting leg portions depending from said head portion, with said leg portions extending through said chamber to form a restricted passageway through both apertures and being flared apart outwardly of said second orifice to restrain the cotter pin against axial displacement in a given direction, the head portion of said cotter pin effectively restraining the same against axial displacement in a direction opposite said given direction.

References Cited in the file of this patent
UNITED STATES PATENTS

| | | |
|---|---|---|
| 1,818,258 | Issacks | Aug. 11, 1931 |
| 1,905,527 | Thomas | Apr. 25, 1933 |
| 1,943,326 | Kocher | Jan 16, 1934 |
| 2,115,340 | McCrosson | Apr. 26, 1938 |
| 2,153,726 | Scoppola | Apr. 11, 1939 |
| 2,723,767 | Thrush | Nov. 15, 1955 |
| 3,042,246 | Welty | July 3, 1962 |